Dec. 19, 1939.  G. D. RUETZ  2,184,085
DRINK MIXER
Filed May 26, 1938  2 Sheets-Sheet 1

Inventor.
George D. Ruetz

Attorneys.

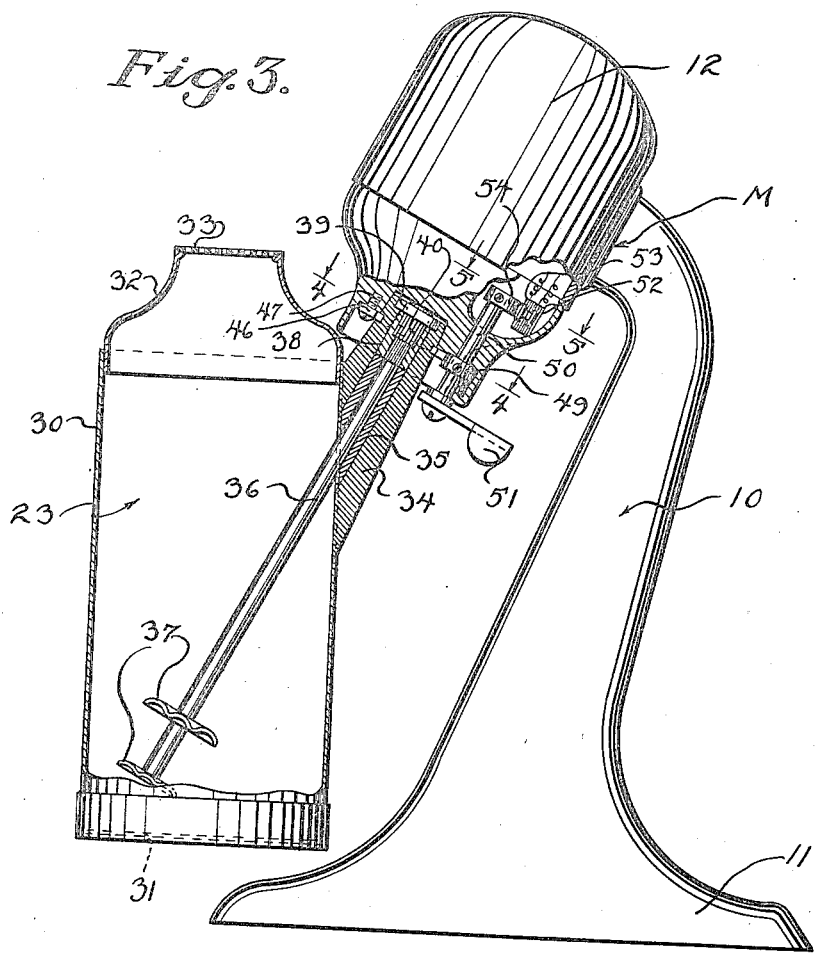
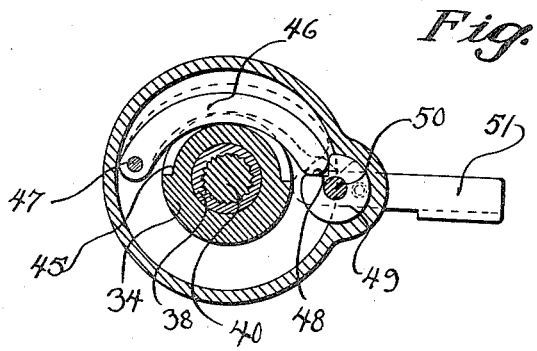
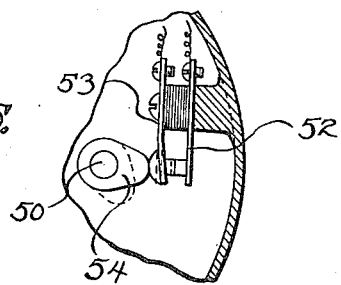

Patented Dec. 19, 1939

2,184,085

UNITED STATES PATENT OFFICE 2,184,085

DRINK MIXER

George D. Ruetz, Racine, Wis.

Application May 26, 1938, Serial No. 210,155

6 Claims. (Cl. 259—106)

This invention appertains to mixers of the type generally employed in soda fountains, service bars, and the like, for mixing drinks.

One of the primary objects of my invention is to provide a mixer in which the drink can be thoroughly agitated, irrespective of the nature or consistency thereof, in a minimum of time, and without undue load being placed on the motor of the mixer.

Another salient object of my invention is the provision of means, whereby the mixing rod and agitating blade are normally disposed at an angle to the axial center of the mixing cup or vessel to effectively eliminate the usual central vortex caused by an axially disposed heater shaft, which tends to merely stir the liquid instead of mixing the same and cause the liquid to flow over the upper edge of the mixing cup.

A further object of my invention is to provide novel means for causing a rotary agitation of the liquid in the mixing cup at an angle to the longitudinal axis of the cup, whereby to force the liquid against the side walls of the cup at an angle thereto, and thereby provide for the rapid mixing of the drink in the cup, and preventing flow of the liquid over the upper edge of the cup.

A further important object of my invention is to provide a drink mixing device embodying an angularly disposed motor, and a vertically disposed mixing cup carrying an angularly arranged mixing shaft and beater, with means for detachably coupling the mixing shaft with the drive shaft of the motor when the cup and motor are placed in predetermined relation.

A still further object of my invention is the provision of novel means for rotatably mounting the upper end of the mixing rod or shaft adjacent to the upper end of the mixing cup, whereby likelihood of leakage of liquids around the mixing rod or shaft is eliminated.

With these and other objects in view, the invention consists in the novel construction, arrangement, and formation of parts, as will be hereinafter more specifically described, claimed, and illustrated in the accompanying drawings, in which drawings:

Figure 3 is a view similar to Figure 1, illustrating a slightly modified form of my invention.

Figure 4 is a detail sectional view taken on the line 4—4 of Figure 3, looking in the direction of the arrows, illustrating the means for detachably connecting the cup with the motor casing.

Figure 5 is a detail fragmentary sectional view taken substantially on the line 5—5 of Figure 3, looking in the direction of the arrows, illustrating the means for closing the circuit through the motor when the mixing cup is in its operative position relative to the motor.

Figure 1:
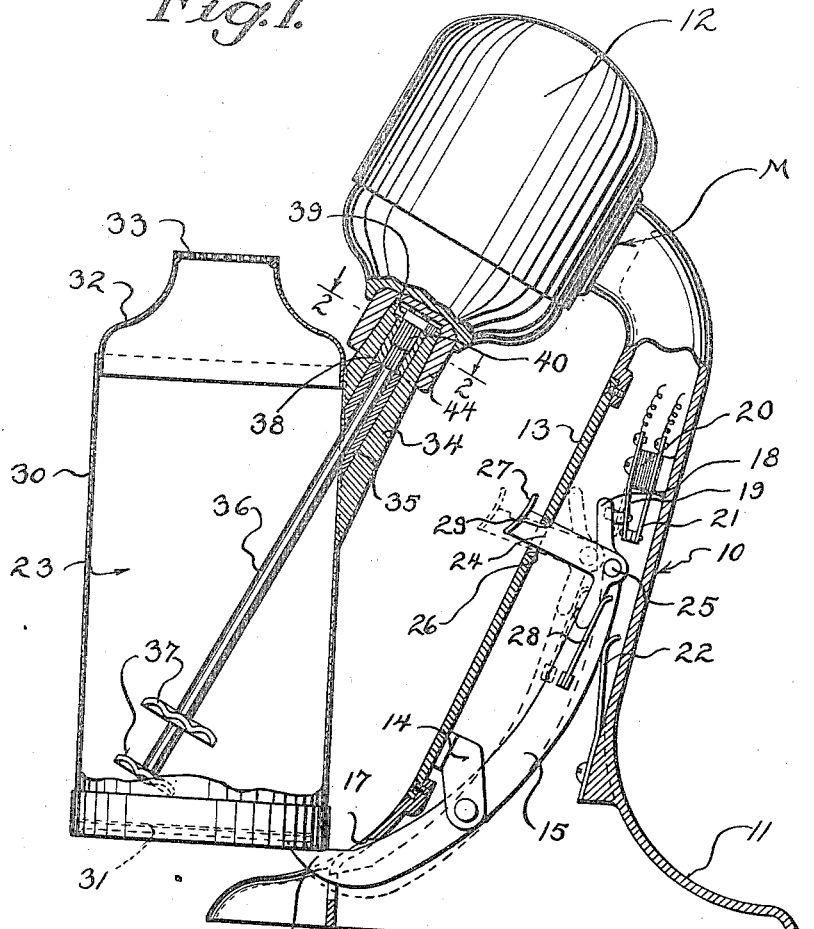
Figure 1 is a side elevational view of my improved power drink mixing device, with parts thereof broken away and in section to illustrate structural details, the mixing cup being shown in its operative position.

Referring to the drawings in detail, wherein similar reference characters designate corresponding parts throughout the several views, the letter M generally indicates my improved drink mixer, which comprises a standard 10 having a flaring supporting base 11. The upper end of the standard 10 carries the electric motor 12, and it is to be noted that both the motor 12 and the standard 10 are arranged at an acute angle to the vertical. As is also shown in Figure 1, the standard or column 10 can be of a hollow construction, and various mechanisms can be housed within the column or standard, as will now be described.

The front of the column 10 can be provided with a removable panel 13, and this panel can be secured in position in any preferred manner. Rockably mounted on the lower end of the panel 13 through the medium of a bracket 14 is an operating lever 15. The lower end of the lever extends beyond the bracket 14, and is provided with a foot 16, which is adapted to ride through a slot 17 formed in the base of the mixer. The upper end of the lever 15 carries an extension 18, which is adapted to engage and hold the flexible spring leaf 19 of the electric switch 20 against the other switch leaf 21, when said lever is in one of its two positions. The switch 20 controls the operation of the motor 12, and hence when the leaf 19 is in contact with the leaf 21, the circuit through the motor 12 is closed. A leaf spring 22 is normally employed for rocking the lever 15 on its pivot with its extension 18 away from the switch, so that the switch will be normally in an open position.

In order to hold the lever 15 in its operative position with the switch closed and the foot 16 out of the column for supporting the lower end of the mixing cup 23, a latch 24 is provided. This latch is of bell crank shape, and is rockably mounted at its angle, as at 25, on the lever 15, and the latch lever extends out through a slot 26 in the column. A fingerpiece 27 is arranged on the latch to facilitate the manipulation thereof, and a spring 28 functions to normally hold the upper edge of the latch against the upper edge of the slot 26, whereby the keeper notch 29 in the latch will engage the lower edge of the slot 26 in the panel 13.

When the latch is depressed against the tension of the spring 28, the spring 22 will function to rock the lever 15, as will be readily apparent.

The construction and arrangement of the mixing container or cup 23 forms one of the salient features of my invention, and it is to be noted that the same includes a substantially cylindrical side wall 30, and an imperforate bottom wall 31. A closure cap 32 can be provided for the cup, if so desired, and the cap can carry a strainer or screen 33, whereby the liquid being poured from the cup can be strained where necessary or desired.

Extending angularly from the side wall 30 of the mixing cup is a sleeve 34. This sleeve 34 is arranged adjacent to the extreme upper end of the cup, and carries an oilless bearing 35 for the mixing rod or shaft 36. The shaft or mixing rod 36 extends into the cup at an angle to the longitudinal axis of the cup, and terminates short of the bottom wall 31 of the cup. The lower end of the mixing rod can carry one or more mixing blades or propellers 37, which can be of any desired character. Fixed to the upper end of the mixing rod 36 is a coupling 38, and this coupling rests upon the bearing 35, and is held against the removal from said bearing by a holding ring 39, which engages the sleeve 34. This coupling has its interior bore provided with a series of serrations for driving connection with the lower end of the armature shaft 40. The lower end of the armature shaft is provided with ribs for engagement with the walls of the grooves of the coupling.

Figure 2:
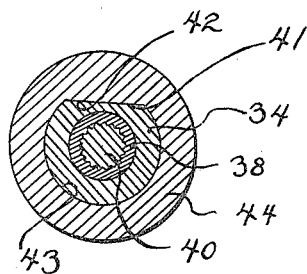
Figure 2 is a detail sectional view, taken on the line 2—2 of Figure 1, looking in the direction of the arrows.
Figure 2:
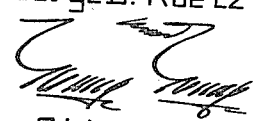

As is clearly shown in Figure 2 of the drawings, one side of the sleeve 34 is flattened, as at 41, and this flattened side is adapted to snugly engage the flattened wall 42 of the socket 43 formed in the lower end of the motor casing 44, the socket 43 being provided for detachably receiving the upper end of the sleeve 34. Obviously, the engagement of the flat sides 41 and 42 reduces any tendency of the sleeves 34 to rotate under rapid rotation of the mixing rod 36.

In use of my improved mixer, the cup 23 is removed from the motor by merely depressing the latch 24 and pushing down on the cup until the sleeve 34 rides out of the socket 43 formed in the lower end of the motor casing. As the mixing rod 36 and the propellers 37 are associated with the mixing cup at all times, the rod and its propellers can be thoroughly cleaned at the time of the washing of the mixing cup, and thus all dripping from the mixing rod and propellers is eliminated, as is generally found in mixing devices where the shafts and propellers are attached to the motor at all times. Further, bending or the throwing out of line of the mixing rod from the armature shaft of the motor by the constant hitting of the cup against the mixing rod is prevented, as the rod is carried at all times by the cup.

The material to be mixed is placed in the cup in the ordinary manner, and, obviously, ice cream and the like will be disposed above the agitator propellers or blades 37, and thus the ice cream will be quickly mixed with the liquids contained in the cup. In devices where the cup is removable from the mixing rod and propellers, the propellers and rod tend to push the ice cream down in the bottom of the cup as the cup is brought into place. Consequently, the propellers merely tend to bore a hole in the ice cream, and tend to mix the ice cream with the liquid. This also places an initial heavy load on the motor.

Great stress is laid on the fact that the mixing rod is rotatably carried at its upper end adjacent to the upper end of the cup in view of the fact that liquid leaking around the shaft is reduced to a minimum, and if any liquid should seep around the mixing rod or shaft, no damage will be done. In certain mixers it is proposed to carry the propellers by the bottom wall of the mixing vessels or cups, and in actual practice liquid tends to seep around the propeller shafts causing damage to the entire mixer.

As the mixing shaft or rod extends into the cup at an angle to the longitudinal axis of the cup, the forming of an axial vortex in the cup, during the rapid rotation of the mixing rod, is entirely eliminated. Thus, flowing of the liquid over the top edge of the cup is eliminated, and the liquid is thrown at an angle against the side walls of the cup, and a rapid mixing of the liquids in the cup is assured. This is a decided improvement over mixers in which the propellers and mixing shafts are axially located, in that these propellers merely tend to stir and not mix the liquid.

My device is open to various changes, and Figure 1 merely illustrates one form thereof. In Figures 3 to 5, inclusive, another and slightly modified form of my invention is illustrated. In this form the sleeve 34 can be provided with a keeper groove 45 adjacent to its upper end in which is adapted to be received the swinging latch lever 46. The latch lever 46 is rockably mounted at one end on a pivot pin 47 carried by the motor casing. The opposite end of the latch lever is confined between the walls of a notch 48 formed in an operating disc 49, keyed or otherwise secured to the operating shaft 50. The lower end of the shaft 50 extends beyond the motor casing, and is provided with an operating handle 51. Obviously, by rotating the handle 51, the latch 46 can be brought into and out of locking engagement with the sleeve 34 for holding the sleeve in coupled position with the motor. When the sleeve 34 is placed in position on the motor with the rod 36 in driving connection with the armature shaft of the motor, and the sleeve is held against movement by the latch 46, then the circuit through the motor is closed through the use of a switch 52.

The switch 52 includes a movable blade 53, and this movable blade is held in contact with the other blade of the switch by a cam 54 attached to the shaft 50. When the lever 51 is manipulated to move the latch 46 from out of its keeper groove 45, then the cam 54 is moved away from the resilient leaf of the switch, and this leaf will move by its inherent resiliency from out of contact with the other leaf of the switch.

Various other changes in details can be made without departing from the spirit or the scope of this invention, but what I claim as new is:

1. In a drink mixing device, a motor, a support for holding the motor in an elevated position, said motor including a depending armature shaft, a casing having a socket in axial alinement with the armature shaft, a drink mixing cup adapted to be disposed below the motor, an angularly extending sleeve on said cup adapted to be detachably received in the socket, a rotatable mixing rod carried by the sleeve extending into the cup having agitating means thereon, and a coupling for detachably connecting the rod with the armature shaft.

2. A drink mixing device comprising a motor, a support for holding the motor in an elevated position, said motor including a casing having a socket and an armature shaft extending axially into the socket, a mixing cup disposed below the motor, an angularly extending sleeve rigid with said cup detachably fitted in the socket, a mixing rod rotatably carried by the sleeve extending into said cup and having agitating means thereon, and a coupling carried by the said rod adapted to detachably receive the armature shaft.

3. A drink mixing device comprising a motor, a support for the motor, said motor including a casing having a socket and an armature shaft extending axially into the socket, a mixing cup, a sleeve rigid with said cup detachably fitted in the socket, a mixing rod rotatably carried by the sleeve extending into said cup and having agitating means thereon, a coupling carried by the said rod adapted to detachably receive the armature shaft, and means for detachably locking the sleeve to the motor casing when said sleeve is in said socket.

4. A drink mixing device comprising a motor, a support for the motor, said motor including a casing having a socket and an armature shaft extending axially into the socket, a mixing cup, a sleeve rigid with said cup detachably fitted in the socket, a mixing rod rotatably carried by the sleeve extending into said cup and having agitating means thereon, a coupling carried by the said rod adapted to detachably receive the armature shaft, means for detachably locking the sleeve to the motor casing when said sleeve is in said socket, said means being manually operable, and a switch controlling the motor actuated from said manual means.

5. A drink mixing device comprising a motor having a casing provided with an axially disposed socket and an armature shaft extending into said socket, a mixing cup, a sleeve rigid with said mixing cup, a mixing rod rotatably mounted in said sleeve extending into said cup and having agitating means thereon, the sleeve being removably received in the socket and having a keeper notch therein, a latch lever rockably carried by the motor movable into and out of said keeper notch when the sleeve is in the socket, means for actuating the latch including an operating shaft and a handle, and a switch for said motor operated from said shaft.

6. A drink mixing device comprising, a motor, a support for holding the motor in an elevated position, said motor including a casing having a socket, and an armature shaft extending axially into the socket, the inner wall of the socket having at least one flat side, a mixing and serving cup disposed below the motor for removable association therewith, an angularly extending sleeve rigidly secured to the upper end of the cup, a mixing rod rotatably carried by the sleeve extending into said cup and having agitating means thereon, the outer face of the sleeve being provided with at least one flat side, said sleeve being detachably fitted in the socket with the flat side thereof in engagement with the flat side of the socket, whereby the sleeve will be held against rotation, and a coupling for detachably connecting the rod with the armature shaft.

GEORGE D. RUETZ.